Sept. 12, 1967  M. P. G. LEBRETON  3,340,564
LOCKING MECHANISM
Filed March 8, 1965  2 Sheets-Sheet 1

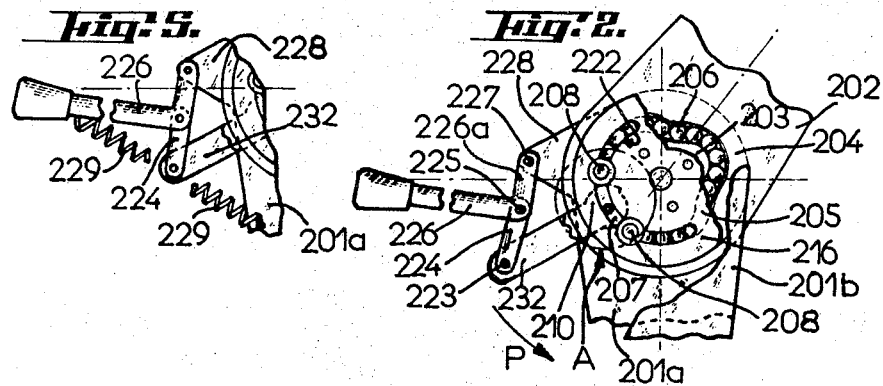
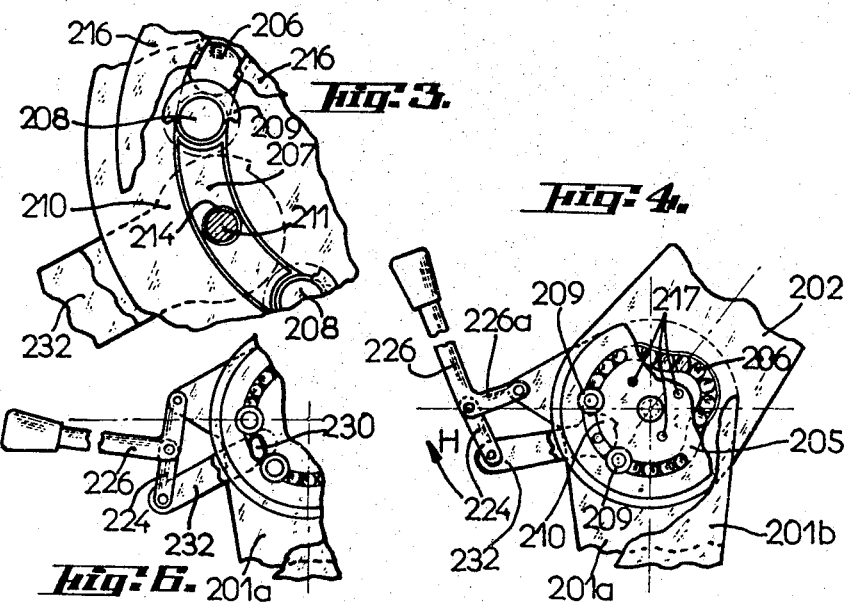

United States Patent Office 3,340,564
Patented Sept. 12, 1967

3,340,564
LOCKING MECHANISM
Marc Paul Gaston Lebreton, Lagny, France, assignor to Demaria-Lapierre & Mollier, Lagny, France, a corporation of France
Filed Mar. 8, 1965, Ser. No. 437,691
Claims priority, application France, Mar. 9, 1964, 966,711; Nov. 13, 1964, 994,972
5 Claims. (Cl. 16—140)

An essential object of this invention is a device for locking two pieces in movable relationship to each other.

According to a characteristic of the invention the mechanism for locking two pieces comprises a way or channel provided in the first of the aforesaid two pieces; movable members placed in the said channel; a stop rigidly fixed to the second aforesaid piece and inserted in the aforesaid channel; an adjustable stop movable between at least two extreme positions pressing the aforesaid movable members against one another and against the aforesaid stops in one of the said positions and releasing the said members in the other position.

In accordance with another characteristic of the invention the curved shape of the channel, the width of the channel and the relative dimensions of the movable members moving in the said channel are selected in such a fashion that when the device is locked by the action of the aforesaid adjustable stop all movement of movable members inside the said channel tends to increase the space taken up by the said members inside the said channel.

According to another characteristic of the invention the aforesaid channel is of a substantially constant width and has a sinuous way.

According to yet another characteristic the aforesaid sinuous way comprises at least a part of a closed plane curve delimiting a single interior area.

According to another characteristic of the invention the aforesaid plan curve is undulating.

In accordance with another characteristic a circular ring sector is inscribable in the aforesaid channel.

In accordance with another characteristic of the invention the aforesaid stop consists of a cam, the faces of which bear against the two aforesaid movable members.

According to yet another characteristic of the invention the two aforesaid adjustable and rigidly fixed stops comprise at least one cam revolving about an axis rigidly fixed to the second aforesaid piece, the said axis traversing the aforesaid channel and the said cam bearing against two aforesaid adjacent movable members.

According to the form of embodiment which will be described in detail hereinafter the two aforesaid pieces are rigidly fixed to an axis round which they may describe a relative movement of rotation with respect to each other. This being so it is understood that when the device is locked the two aforesaid pieces cannot rotate with respect to each other as the aforesaid axis, round which the aforesaid cam rotates, which axis is mounted rigidly fixed to the aforesaid second piece (which it crosses) cannot rotate in the channel in which the movable members are locked. As the axis round which the two aforesaid pieces are mounted and the axis of the aforesaid cam are not merged, all relative rotational movement of the said pieces with regard to each other is prevented.

The invention also relates, as new industrial products, to sliding, rotating or tipping assemblies and in particular armchairs with adjustable backs utilizing the aforesaid locking device.

Other characteristics of the invention will become apparent during the description which follows.

In the accompanying drawings which are given simply by way of example:

FIGURE 2 shows on a smaller scale a view in plan in the direction of arrow F of FIGURE 1, with partial stripping of the device of FIGURE 1 shown in the locked position;

FIGURE 3 is a larger scale view of a detail A of FIGURE 2;

FIGURE 4 is a similar view to that of FIGURE 2 but showing the device in the unlocked position;

FIGURE 5 is a detailed view in plan, with partial stripping, of a variant of a device of the invention;

FIGURE 6 shows a detailed view with partial stripping of a variant of a device of the invention.

Figure 1:
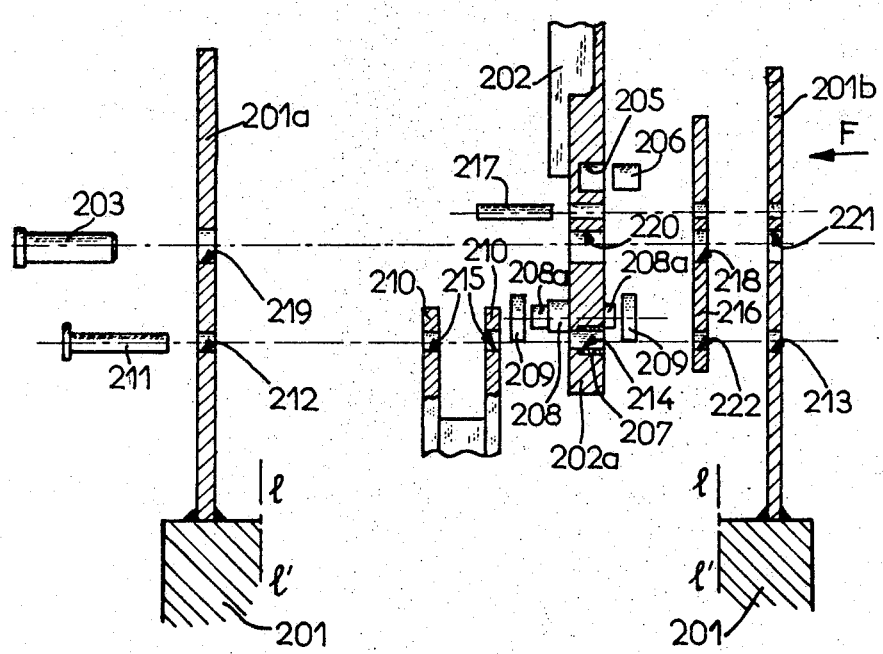
FIGURE 1 shows a broken open cross sectional view, partly stripped, of a device in accordance with the invention.

According to the form of embodiment shown in FIGURES 1 to 4, two pieces, 201 and 202 respectively, are mounted in rotation one with respect to the other around a rotation shaft 203. Piece 201, according to the form of embodiment shown, comprises for this purpose two side plates 201a and 201b rigidly fixed to said piece 201. In FIGURE 1 piece 201 has been cut along line 1–1' to show the whole of the device broken open. In the assembled position all the members included between the side plates 201a and 201b are positioned between these two side plates drawn together. To make this clear it might be said that piece 201 for example, is rigidly fixed to the floor of a car (not shown) and piece 202 is rigidly fixed to the back of a seat which is tiltable and adjustable owing to the device of the invention.

Rigidly fixed to piece 202 are two rims respectively interior 203 and exterior 204, between which a channel 205 is provided in which move the movable members 206 having the form of cylindrical rollers.

As can clearly be seen in FIGURES 2 and 4 the rollers 206 fill almost the totality of channel 205 with the exception of a section 207 (FIGURE 3) and of two rollers 208 adjacent to section 207 and comprising prolongations 208a (FIGURE 1) projecting out of channel 205. Rollers 208, with regard to their portion which turns in channel 205 of constant width, are of the same diameter as rollers 206, this means that the rollers may normally move freely inside channel 205 with a slight play.

At the two ends 208a of the two rollers 208 are positioned collars 209 on which the two cams 210 bear, as will be explained hereinafter. In the assembled position the two cams 210 overlap side plates 202a in such a manner that cams 210 arrive opposite the corresponding collars 209.

Cam 210 is in an articulated position around axis 211 which passes through the side plates 201a and 201b, respectively in the ports provided 212 and 213, section 207 in a port 214 and cams 210 in ports 215.

An additional side plate 216 is provided to prevent the rollers 206 from coming out of the said channel when the device is assembled. Side plate 216 is mounted rigidly fixed to side plates 202a and 201b by pins 217 or similar means. Side plate 216 also comprises a substantially central port 218 for the passage of shaft 203 which traverses the entire device, that is to say successively through side plate 201a in a port 219, side plate 202a in a port 220, side plate 216 in a port 218 and side plate 201b in a port 221. In addition, side plate 216 comprises a semi-circular channel or slot 222, sufficiently wide to allow passage of axis 211 and cam 210 and sufficiently narrow to prevent passage of rollers 206. Slot 222 also allows passage of ends 208a of two rollers 208, so that when the assembly is mounted collars 209 adjacent to side plate 216 are positioned outside the said side plate, with respect to side plate 202a, as can clearly be seen in FIGURES 2 and 4.

Cams 210 are rigidly fixed to a lever arm 232 (FIGURES 2 and 4) with the free end articulating around axis 223 on a link 224, the other end of which articulates around axis 225 on an L-shaped bent lever 226, which articulates by the end of one of its arms 226a round an axis 227 pivoting inside a corresponding port practiced in an extension 228 of side plates 201a and 201b.

The operation of the device is clearly seen in FIGURES 2 and 4.

In the locked position of the device shown in FIGURE 2, arm 226a of L-shaped lever 226 and link 224 are substantially in alignment and lever 232 is pushed downwards to the maximum in the direction of arrow P, so that cam 210 produces maximum separation of rollers 208 by action on collars 209, pressing all the movable members 206 against one another inside the channel. The surface of the cam is selected so that locking occurs progressively. It is established that a clearance of lever 232 in the range of 10° is usually sufficient to obtain very efficient locking of the device.

It is advantageous if, in the locked position of the device (as shown), the centres of axes 227, 225 and 223 are slightly set off, so the centres of axis 225 is slightly displaced (towards the right as shown in FIGURE 2) with respect to the centre line of axes 223 and 227. So that when the device is locked it goes beyond the neutral position corresponding to the alignment of the centres of axes 227, 225 and 223, and there is no risk of the device being accidentally unlocked.

Practically it is evident that when blocked the device acts as if the total of the rollers 206 inside the sinuous channel 205 composed a non-deformable solid and consequently prevent all relative movement of the balls 206 inside channel 205. The shape of channel 205 shown in FIGURES 2 and 4 is particularly effective for the objective of the invention. In particular the symmetrical shape with two points of inflection, as shown, ensures very effective locking.

To unlock the device it is only necessary to pull lever 226 upwards, as shown in FIGURE 4, bringing lever 232 upwards in the direction of arrow H, the narrowed width of cam 210 brings rollers 208 nearer together and the roller assembly 206 inside channel 205 is unlocked.

The control device of lever 232 and cam 210 in association, as shown in FIGURES 2 and 4, enables a worthwhile reduction of stress as the clearance of lever 226 between the locked and unlocked positions is in the range of 40° whilst the angle of rotation of cam 210 is only in the range of 10°.

It is advantageous, as shown in FIGURE 5, to provide a spring 229 to prevent lever 226 returning intempestively to the unlocked position. In this case it is not necessary to go beyond the neutral point as shown in FIGURE 2.

In accordance with the variant in detail shown in FIGURE 6, cam 210 can usefully be replaced by a roller 230 rigidly fixed to lever 232, roller 230 being of elliptical shape or analogous. In this case the entire channel 205 is normally filled by rollers 206 which are all similar.

Numerous variants may be brought to the methods of carrying out the positioning of the various pieces relative to one another, particularly in as far as the adjustable stop and the breaking device or locking of the movable lever are concerned.

Likewise, the principle of the invention can be applied to any other locking device for locking two pieces moving with respect to each other, such for example as a movement of translation or any other movement.

Furthermore, it may be seen that the effect of the friction of the rollers against one another and against the walls of channel 205 is the greater the more sinuous the shape of the channel, and in consequence the reaction forces of the rollers on the walls of the channels are greater. The existence of these frictional forces in opposition to the rolling and sliding movements of the rollers in their channel make the devices of the invention extremely effective.

The surfaces of the movable members and possibly the walls of channel 205 may be ribbed, grooved or treated in any suitable way to increase the friction coefficient of the movable members with respect to one another and possibly with the walls of the channel in which they move. In this way optimal locking of the device according to the invention is achieved. It is understood that these movable members may consist of any members able to roll or slide in the channel such as rollers, balls or analogous.

It is understood that the invention is in no way limited to the methods of carrying it into effect and embodiment described and represented which have simply been given by way of example.

What I claim is:

1. A device for locking against relative rotational movement two pieces coaxially mounted about a common rotation axis characterized in that it comprises a channel extending around said axis along a plan curve, said channel being provided in the first of said two pieces, movable members located in said channel the width of which is substantially the same as the width of said movable members, a shaft rigidly fixed to the second of said pieces and inserted in said channel, a cam member revolving about said shaft and having at least two cam-forming parts which are respectively in contact with at least two projecting parts, which project outside said channel, two movable stop members between which said shaft is inserted and which are themselves inserted in said channel between and in contact with two consecutive ones of said movable members and lever means for revolving said cam member around said shaft between two extreme positions, said movable members being pressed against one another, against the walls of said channel and against said two movable stop members and said cam member in one of said extreme positions or locked position and released in the other extreme position or unlocked position.

2. A device for locking against relative rotational movement two pieces coaxially mounted about common rotation axis characterized in that it comprises a channel extending around said axis along a sinuous closed plan curve, said channel being provided in the first of said two pieces, movable members located in said channel, the width of which is substantially the same as the width of said movable members, a shaft rigidly fixed to the second of said pieces and inserted in said channel, two cam members revolving about said shaft on each side of said channel each of them having two diametrically located cam-forming parts which are respectively in contact with collars provided on projecting parts, which project outside said channel on each side thereof, of two movable stop members between which said shaft is inserted and which are themselves inserted in said channel between and in contact with two consecutive ones of said movable members and lever means for revolving said cam member around said shaft between two extreme positions, said movable members being pressed against one another, against the walls of said channel and against said two movable stop members and said cam member in one of said extreme positions or locked position and released in the other extreme position or unlocked position.

3. A device for locking against relative rotational movement two pieces coaxially mounted about a common rotation axis characterized in that it comprises a channel extending around said axis along a sinuous closed plan curve of symmetrical shape having two points of inflexion, said channel being provided in the first of said two pieces, movable members located in said channel, the width of which is substantially the same as the width of said movable members, a shaft rigidly fixed to the second of said pieces and inserted in said channel in an area thereof located between said two points of inflexion, a cam member revolving about said shaft and having at least two cam forming parts which are respectively in contact with at least two projecting parts, which project outside said channel, two movable stop members between which said shaft is inserted and which are themselves inserted in said channel between and in contact with two consecutive ones of said movable members and lever means for revolving said cam member around said shaft between two extreme positions, said movable members being pressed against one another, against the walls of said channel and against said two movable stop members and said cam member in one of said extreme positions or locked position and released in the other extreme position or unlocked position.

4. A device for locking against relative rotational movement two pieces coaxially mounted about a common rotation axis characterized in that it comprises a channel extending around said axis along a plan curve, said channel being provided in the first of said two pieces, movable members located in said channel the width of which is substantially the same as the width of said movable members, a shaft rigidly fixed to the second of said pieces and inserted in said channel, a cam member revolving about said shaft and having at least two cam-forming parts which are respectively in contact with at least two projecting parts, which project outside said channel, two movable stop members between which said shaft is inserted and which are themselves inserted in said channel between and in contact with two consecutive ones of said movable members and lever means for revolving said cam member around said shaft between two extreme positions, said movable members being pressed against one another, against the walls of said channel and against said two movable stop members and said cam member in one of said extreme positions or locked position and released in the other extreme position or unlocked position, said lever means comprising a lever arm integral with said cam member and articulated on a link which articulates on the bent portion of an L-shaped bent lever arm pivoting around a pivot, the axis of which is parallel to the axis of said common rotation axis and located at a stationary point of said second piece.

5. A device for locking against relative rotational movement two pieces coaxially mounted about a common rotation axis characterized in that it comprises a channel extending around said axis along a plan curve, said channel being provided in the first of said two pieces, movable members located in said channel the width of which is substantially the same as the width of said movable members, a shaft rigidly fixed to the second of said pieces and inserted in said channel, a cam member revolving about said shaft and having at least two cam-forming parts which are respectively in contact with at least two projecting parts, which project outside said channel, two movable stop members between which said shaft is inserted and which are themselves inserted in said channel between and in contact with two consecutive ones of said movable members and lever means for revolving said cam member around said shaft between two extreme positions, said movable members being pressed against one another, against the walls of said channel and against said two movable stop members and said cam member in one of said extreme positions or locked position and released in the other extreme position or unlocked position, said lever means comprising a lever arm integral with said cam member and articulated on a link which articulates on the bent portion of an L-shaped bent lever arm pivoting around a pivot, the axis of which is parallel to the axis of said common rotation axis and located at a stationary point of said second piece, the plane passing through the axis around which said L-shaped bent lever pivots and the axis around which said L-shaped bent lever and said link are articulated and the plane passing through said latter axis and the axis around which said lever arm and said link are articulated form a dihedral angle, the edge of which is the axis around which said L-shaped bent lever is articulated on said link, said dihedral angle being at least equal to 180° in the locked position and of less than 90° in the unlocked position, the axis around which said L-shaped bent lever and said link are articulated on said link passing the neutral point, between the locked and unlocked positions.

References Cited
FOREIGN PATENTS 17,310  11/1916  Great Britain.

MARVIN A. CHAMPION, *Primary Examiner.*

EDWARD C. ALLEN, *Examiner.*

J. H. McGLYNN, *Assistant Examiner.*